June 17, 1947.   D. N. BROWN   2,422,466
SHEET GLASS FORMING APPARATUS
Filed Nov. 4, 1944

Inventor
DONALD N. BROWN
By
F. N. Knight
Attorney

Patented June 17, 1947

2,422,466

UNITED STATES PATENT OFFICE 2,422,466

SHEET GLASS FORMING APPARATUS

Donald N. Brown, Corning, N. Y., assignor to Corning Glass Works, Corning, N. Y., a corporation of New York Application November 4, 1944, Serial No. 561,931

4 Claims. (Cl. 49—55)

This invention relates to improvements in the art of producing sheet glass and more particularly to an improved method and apparatus for forming a thin sheet or ribbon of glass by flowing and drawing the molten glass downwardly through an elongated orifice or slot in the bottom of a container.

The primary object of the invention is the production of an extremely thin ribbon of sheet glass of a quality suitable for use as microscope cover glasses, insulation for high grade condensers, and the like.

Another object is the continuous production of bead-free glass, i. e., glass of uniform thickness throughout its width.

The foregoing objects have been realized by the employment of a special design die, preferably of platinum or other highly refractory material, having an elongated orifice or slot, the mid-section of which lies in a horizontal plane and the end-sections of which are in planes which continue outwardly and downwardly approximately 30° from vertical. Also, the slot is of maximum width midway between its ends and is made progressively narrower as the ends are approached. The interior of the die comprises a V-shaped well along the area above the intermediate portion of the slot terminated at either end in a somewhat deeper and triangular shaped well. When molten glass is flowed through this die, it is apparently stretched sideways by the drawing action of the glass passing through the end sections of the slot. This action, accompanied by application of a slight amount of cool air directed against the central region of the slot and issuing glass, results in the production of a sheet of glass of substantially uniform thickness throughout its width.

Figure 1:
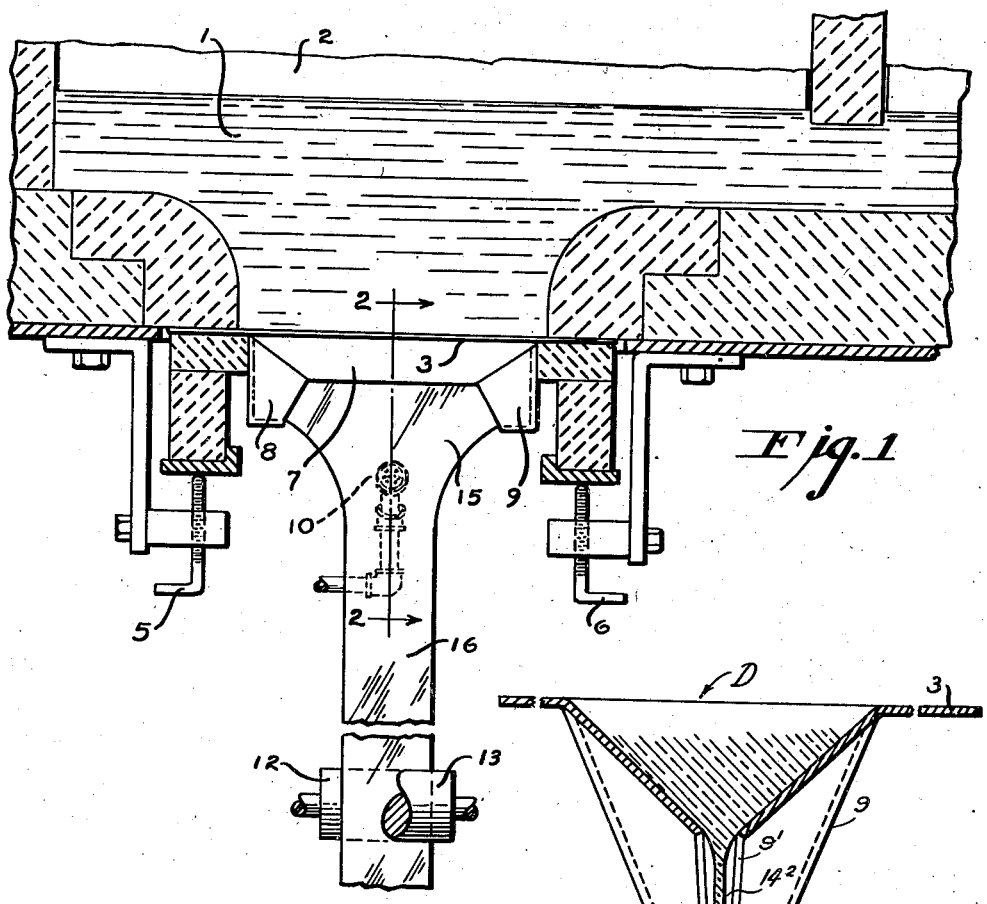
Fig. 1 is a vertical section through the apparatus.
Figure 2:
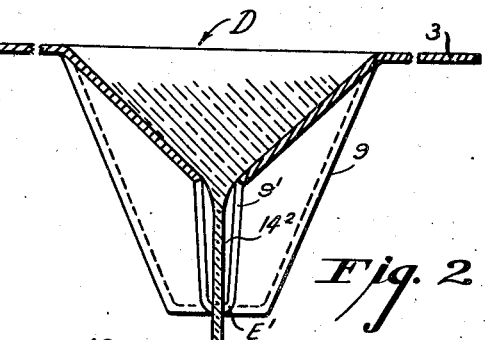
Fig. 2 is a sectional view on an enlarged scale of the die taken on line 2—2 of Fig. 1 and showing fragments of associated air supply pipes in full.
Figure 3:
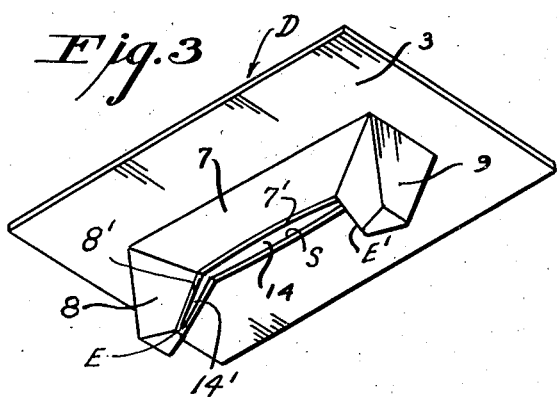
Fig. 3 is a perspective view of the die.

The molten glass 1 is supplied by a container 2 having its bottom opening closed by the glass drawing die D, which has a flange 3 integral therewith, clamped to the refractory surrounding the bottom opening of the container by suitable refractory and metal elements held in position by clamping screws 5 and 6. Depending from flange 3 of the die is the V-shaped central portion 7 and triangular shaped portions or reservoir extensions 8 and 9 having a bottom side 7' and inner sides 8' and 9'. As will be observed from an inspection of Fig. 3, the die slot or opening S is of maximum width in its central region 14 and becomes gradually narrower as the ends E and E' of its end regions 14' and 14² (Fig. 2) are approached. A short distance below the die and adjustably held in any convenient manner, not shown, are a pair of supply pipes terminating in nozzles 10 and 11 pointed toward the central bottom region of the die. A substantial distance below the die are arranged suitable drawing rolls 12 and 13.

It has been found that when glass 15 issues from the die and a small amount of air is directed toward the central region thereof, a thin sheet of glass 16 can be drawn which is of very uniform thickness and free from the beads usually produced on the opposite edges of sheet glass drawn by past known methods.

Although no facilities have been shown for heating the glass in container 2, it will be understood that such heating facilities have been omitted from the drawing for the sake of clearness, as they are not considered to constitute any portion of the invention herein claimed.

Although only one form of apparatus has been shown for the formation of bead-free glass, it should be understood that minor changes in the arrangement and/or form of apparatus disclosed may be resorted to without deviating from the spirit and scope of the invention, and that the same is limited only as set forth in the claims which follow.

I claim:

1. In an apparatus for drawing sheet glass, a drawing die having an opening for supplying glass to the root of the drawn sheet, said opening being in the form of a relatively long narrow slot and said die having depending hollow ends along the inner sides of which the ends of said slot extend.

2. In an apparatus for drawing sheet glass, a drawing die having an opening for supplying glass to the root of the drawn sheet, said opening being in the form of a relatively long narrow slot, narrower at the ends than elsewhere and said die having depending hollow ends along the inner sides of which the ends of the slot extend.

3. In an apparatus for drawing sheet glass from a molten supply body, a glass delivery die having a glass feeding slot therein for the issuance of glass in sheet form, said die also being provided with a horizontal central region and adjoining end regions diagonally disposed with respect to the central region and said slot extending through said central region and along the inner sides of said end regions.

4. In a sheet glass drawing apparatus, a glass delivery die having a substantially horizontal slot therein for the issuance of glass in sheet form, said slot tapering in the width of its opening from the mid-point toward either end thereof, said die also being provided with hollow reservoir extensions at each end which extend a distance along the direction of draw of the sheet and on either side thereof, said slot being extended along the inner sides of said extensions thereby providing a plurality of angularly disposed sections from which glass issues to form the sheet.

DONALD N. BROWN.

REFERENCES CITED

The following references are of record in the file of this patent:

UNITED STATES PATENTS

| Number | Name | Date |
|---|---|---|
| 1,548,444 | Corl | Aug. 4, 1925 |
| 1,670,167 | Reece | May 15, 1928 |
| 1,708,662 | Clark | Apr. 9, 1929 |
| 1,701,899 | Spinasse | Feb. 12, 1929 |
| 1,759,229 | Drake | May 20, 1930 |